United States Patent
Scheibe

(10) Patent No.: US 9,874,256 B2
(45) Date of Patent: Jan. 23, 2018

(54) BRAKE ROTOR WITH TILTED MOUNTING SLOTS

(71) Applicant: HB PERFORMANCE SYSTEMS, INC., Mequon, WI (US)

(72) Inventor: Steve Scheibe, Florence, WI (US)

(73) Assignee: HB PERFORMANCE SYSTEMS, INC., Mequon, WI (US)

( * ) Notice: Subject to any disclaimer, the term of this patent is extended or adjusted under 35 U.S.C. 154(b) by 0 days.

(21) Appl. No.: 14/990,522

(22) Filed: Jan. 7, 2016

(65) Prior Publication Data
US 2017/0198773 A1 Jul. 13, 2017

(51) Int. Cl.
*F16D 65/12* (2006.01)
*F16D 65/02* (2006.01)

(52) U.S. Cl.
CPC .......... *F16D 65/12* (2013.01); *F16D 65/123* (2013.01); *F16D 2065/136* (2013.01); *F16D 2065/1308* (2013.01); *F16D 2065/138* (2013.01); *F16D 2065/1376* (2013.01)

(58) Field of Classification Search
CPC .................. F16D 65/12; F16D 65/123; F16D 2065/1316; F16D 2065/1312; F16D 2065/134; F16D 2065/136; F16D 2065/1376
See application file for complete search history.

(56) References Cited

U.S. PATENT DOCUMENTS

| | | |
|---|---|---|
| 3,642,101 A | 2/1972 | Hauth |
| 3,729,067 A | 4/1973 | Buyze |
| 4,108,286 A * | 8/1978 | Gagarin ................ F16D 65/123 188/218 XL |
| 4,662,482 A | 5/1987 | Bass |
| 4,716,993 A | 1/1988 | Bass |
| 5,520,269 A | 5/1996 | Yamamoto et al. |

(Continued)

FOREIGN PATENT DOCUMENTS

WO 2011/138714 11/2011

OTHER PUBLICATIONS

International Search Report for Application No. PCT/US2016/065930 dated Feb. 6, 2017 (7 pages).

(Continued)

*Primary Examiner* — Nicholas J Lane
(74) *Attorney, Agent, or Firm* — Michael Best & Friedrich LLP

(57) ABSTRACT

The present invention provides a disk brake system comprising a wheel defining a rotational axis, a caliper mounted adjacent the wheel, and a rotor mounted for rotation with the wheel and engageable by the caliper. The rotor includes a mounting slot defined by first and second sidewalls, the first sidewall defining a first axis that substantially intersects the rotational axis, and the second sidewall defining a second axis that is substantially parallel to the first axis. Preferably, the mounting slot defines a center axis that intersects a radial axis of the wheel at an angle of at least 1.5 degrees, preferably at least 2.0 degrees and more preferably about 2.5 to 3.9 degrees. Preferably, the mounting slot has a width and a length that is at least 10% larger, preferably at least 15% larger, and more preferably about 20% larger than the width.

14 Claims, 5 Drawing Sheets

(56) References Cited

U.S. PATENT DOCUMENTS

| | | | |
|---|---|---|---|
| 6,164,421 A * | 12/2000 | Nakamura | B60T 5/00 |
| | | | 188/71.5 |
| 6,247,560 B1 | 6/2001 | Bunker | |
| 6,604,613 B2 | 8/2003 | Burgoon et al. | |
| 6,672,419 B2 | 1/2004 | Buell et al. | |
| 6,957,726 B2 * | 10/2005 | Gehrs | F16D 65/12 |
| | | | 188/18 A |
| 6,988,598 B2 | 1/2006 | Williams | |
| 7,104,368 B2 | 9/2006 | Cornolti et al. | |
| 7,374,023 B2 | 5/2008 | Yamamoto | |
| 7,654,365 B2 | 2/2010 | Lamb | |
| 7,770,699 B2 | 8/2010 | Schlitz et al. | |
| 8,353,391 B2 | 1/2013 | Fujita et al. | |
| 8,474,580 B2 | 7/2013 | Spacek | |
| 2001/0032761 A1 * | 10/2001 | Ruiz | F16D 65/123 |
| | | | 188/218 XL |
| 2003/0006079 A1 * | 1/2003 | Buell | F02B 61/02 |
| | | | 180/219 |
| 2004/0084261 A1 | 5/2004 | Burgoon et al. | |
| 2004/0195059 A1 * | 10/2004 | Williams | F16D 65/12 |
| | | | 188/218 XL |
| 2005/0252739 A1 | 11/2005 | Callahan et al. | |
| 2015/0047932 A1 | 2/2015 | Shinagawa | |

OTHER PUBLICATIONS

Written Opinion of the International Searching Authority for Application No. PCT/US2016/065930 dated Feb. 6, 2017 (4 pages).

* cited by examiner

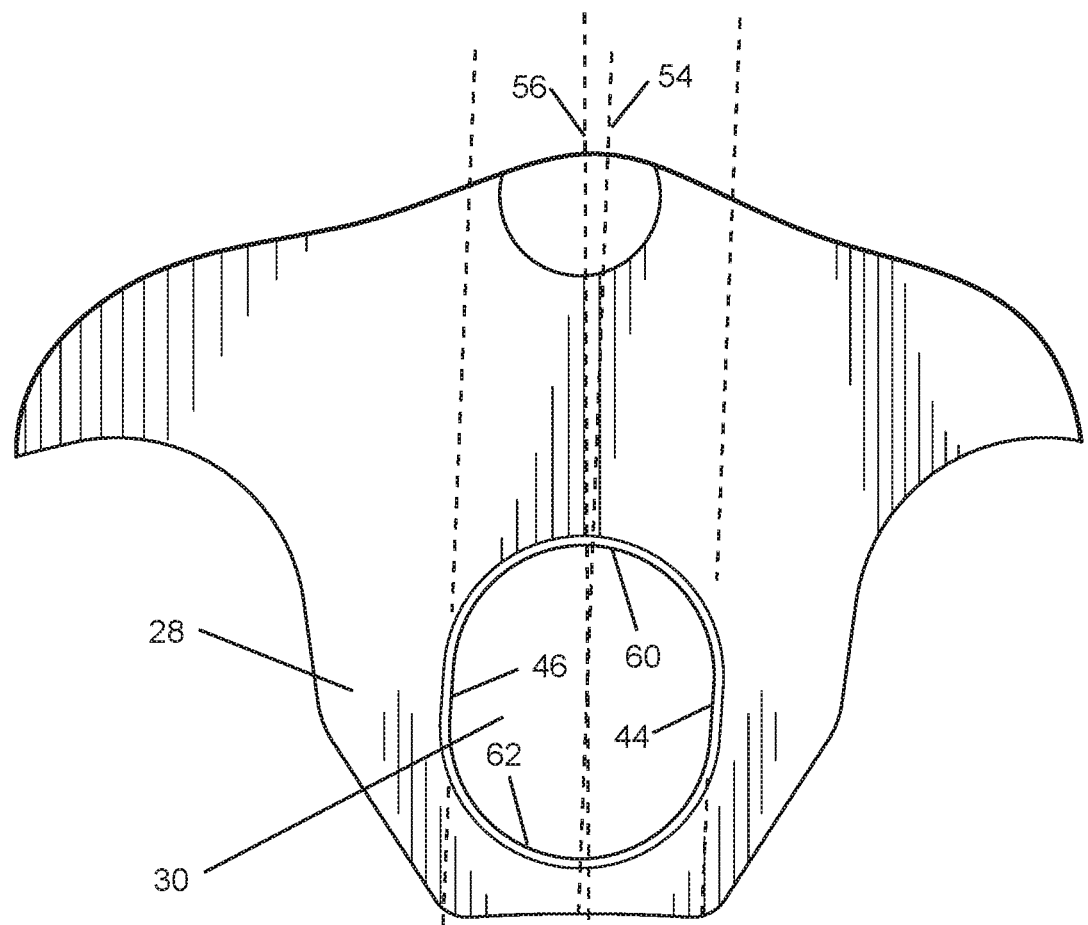

BRAKE ROTOR WITH TILTED MOUNTING SLOTS

BACKGROUND

The present invention relates generally to vehicle brakes, and particularly to brake rotor mounts in a disk brake system.

Disk brake systems typically have a brake rotor mounted to the vehicle wheel and a brake caliper mount to the vehicle frame or suspension. As the caliper applies braking forces to the rotor, the rotor heats up and expands. If the rotor is rigidly secured to the wheel, such thermal expansion can cause the rotor to warp. In order to alleviate this problem, the rotors of modern disk brake systems are commonly mounted to the wheel to allow a certain amount of movement or "float" between the rotor and the wheel.

SUMMARY

The present invention provides a disk brake system comprising a wheel defining a rotational axis, a caliper mounted adjacent the wheel, and a rotor mounted for rotation with the wheel and engageable by the caliper. The rotor includes a mounting slot defined by first and second sidewalls, the first sidewall defining a first axis that substantially intersects the rotational axis, and the second sidewall defining a second axis that is substantially parallel to the first axis. Preferably, the mounting slot defines a center axis that intersects a radial axis of the wheel at an angle of at least 1.5 degrees, preferably at least 2.0 degrees and more preferably about 2.5 to 3.9 degrees.

The disk brake system can also include a mounting post positioned in the mounting slot to secure the rotor to the wheel. The mounting post preferably includes a substantially cylindrical portion positioned in the mounting slot and an exterior surface positioned to engage the first sidewall.

In one embodiment, the mounting slot further includes a first end wall defining a first end of the mounting slot and having a semi-cylindrical shape, and a second end wall defining a second end of the mounting slot and having a semi-cylindrical shape. The rotor can further include a plurality of mounting slots (e.g., five) circumferentially spaced substantially equally around the rotational axis. Preferably, the mounting slot has a width and a length that is at least 10% larger, preferably at least 15% larger, and more preferably about 20% larger than the width.

Other aspects of the invention will become apparent by consideration of the detailed description and accompanying drawings.

BRIEF DESCRIPTION OF THE DRAWINGS

FIG. 6 is an enlarged plan view of a portion of the rotor of FIG. 5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
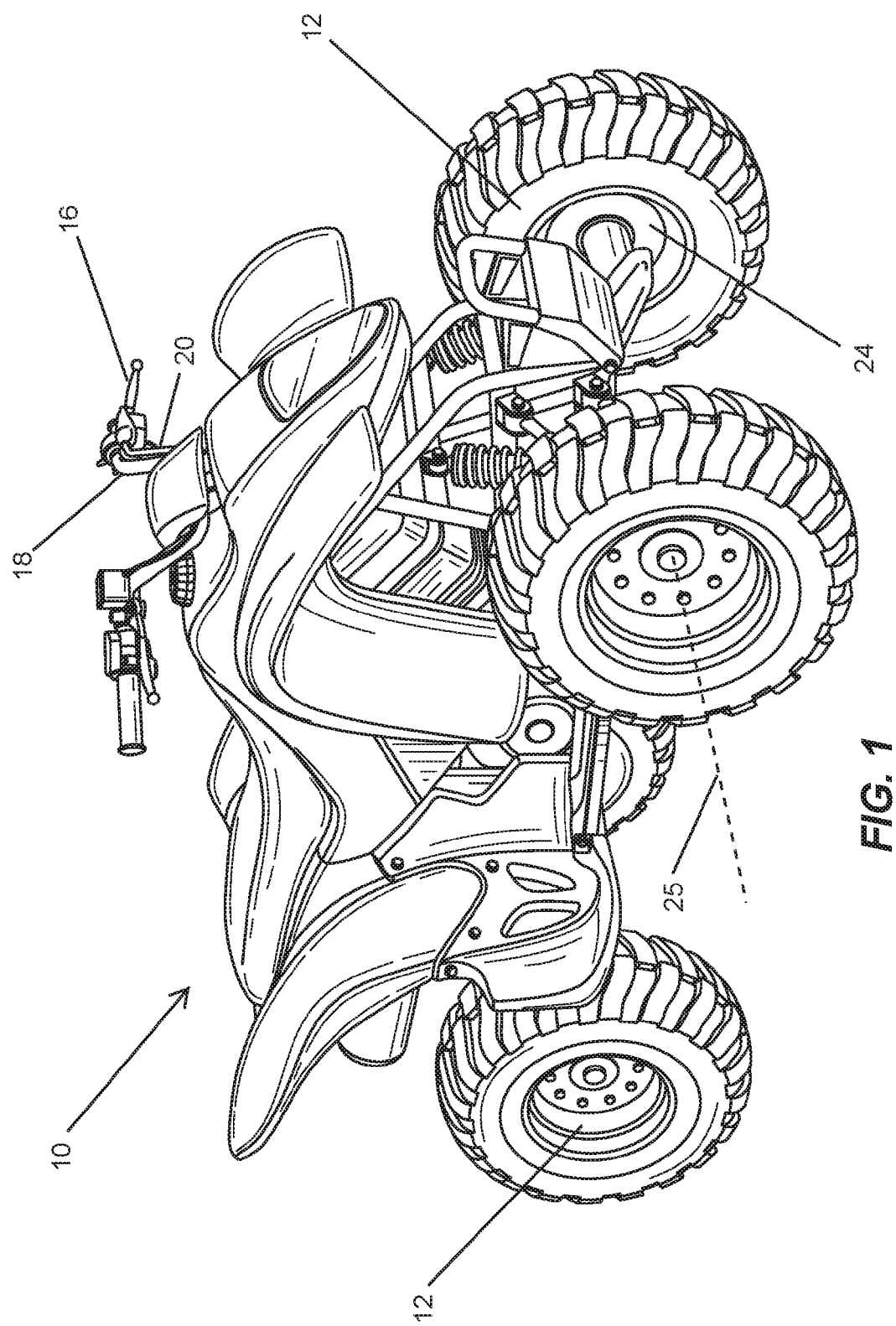
FIG. 1 illustrates a vehicle having a brake rotor embodying the present invention.
Figure 2:
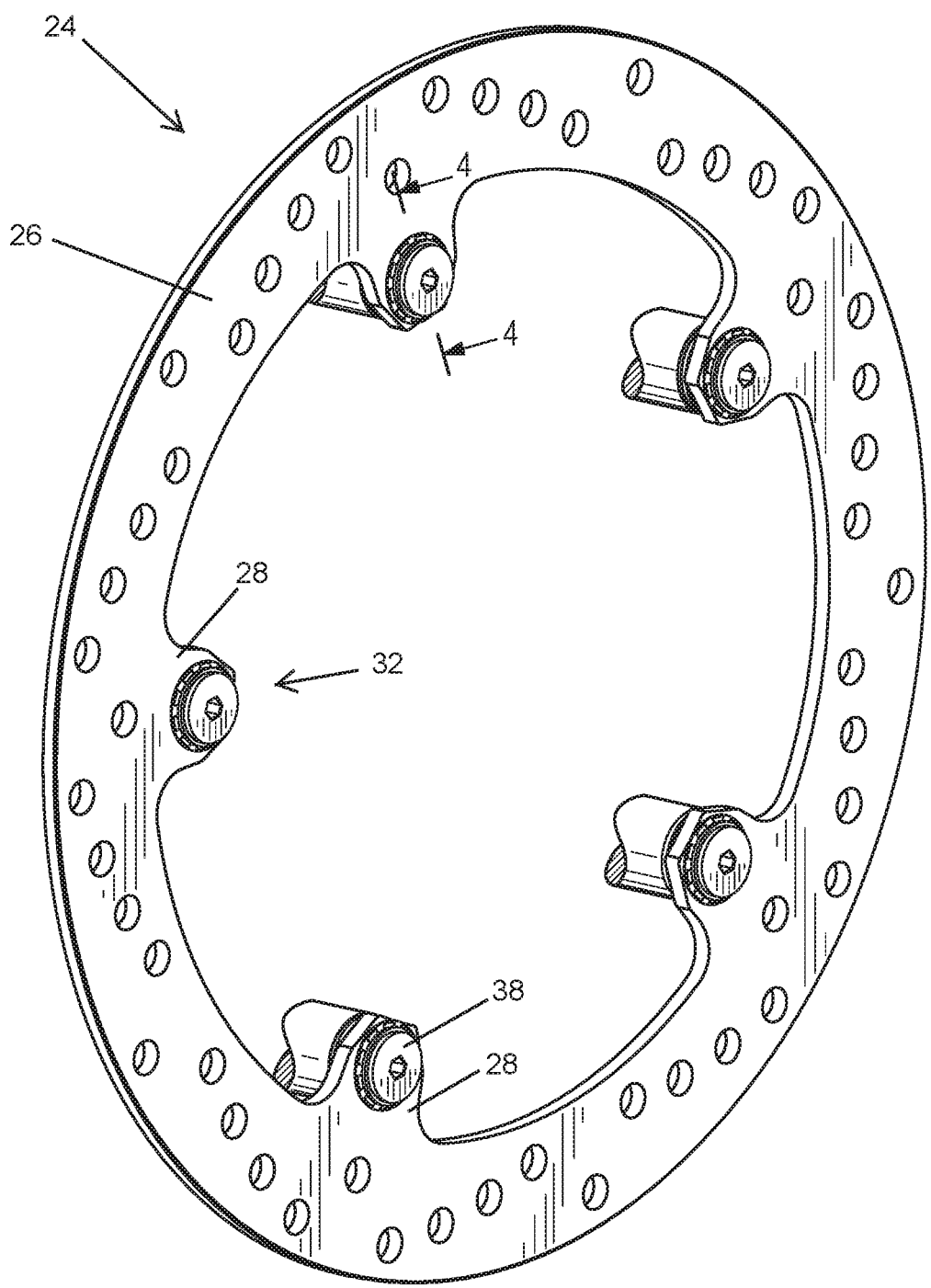
FIG. 2 is a perspective view of a portion of a wheel and rotor used on the motorcycle of FIG. 1.
Figure 3:
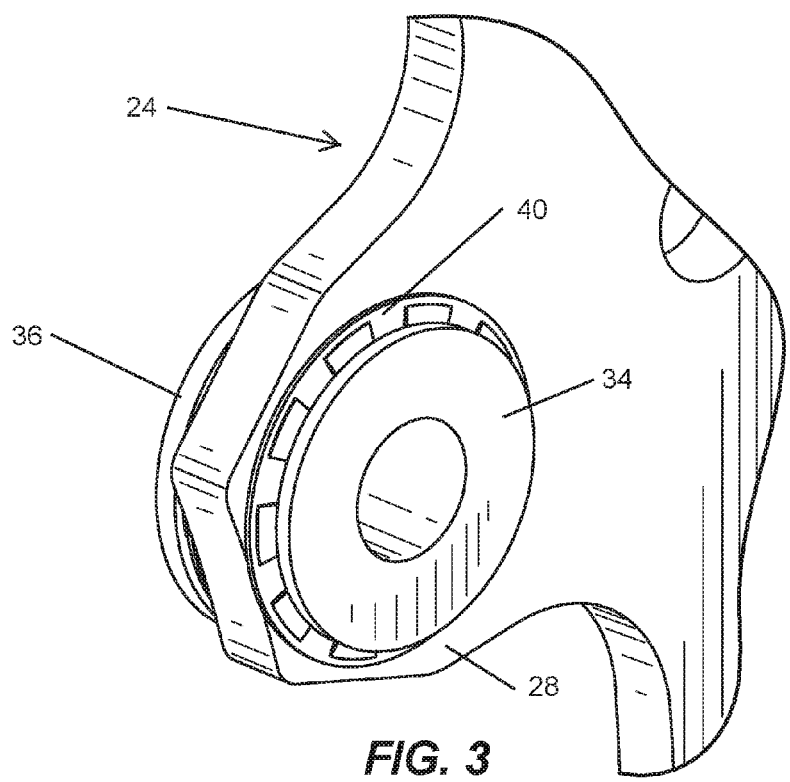
FIG. 3 is an exploded perspective view of the rotor of FIG. 2.
Figure 4:
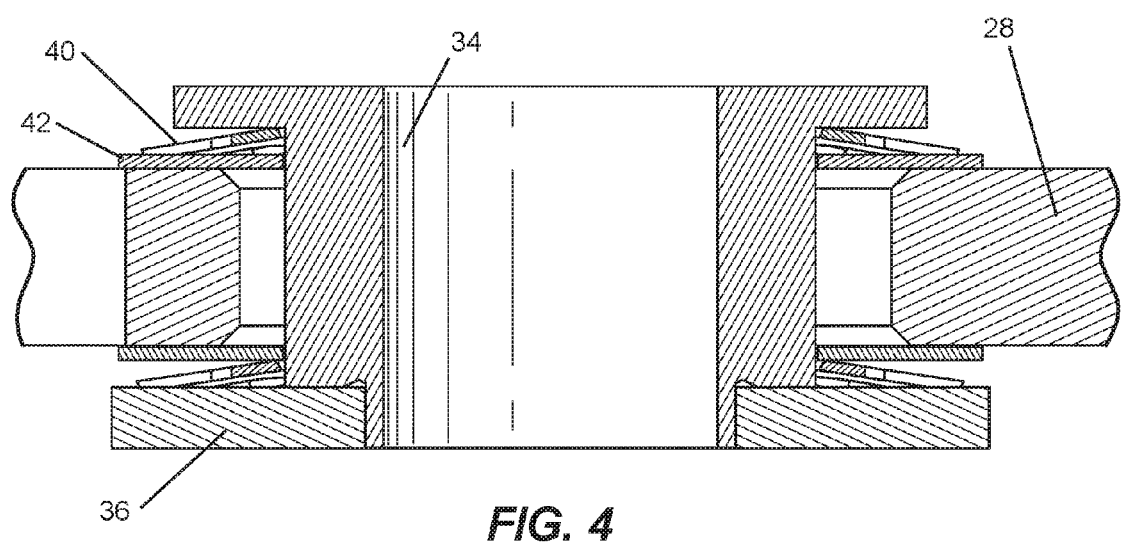
FIG. 4 is a section view taken along line 4-4 in FIG. 2.
Figure 5:
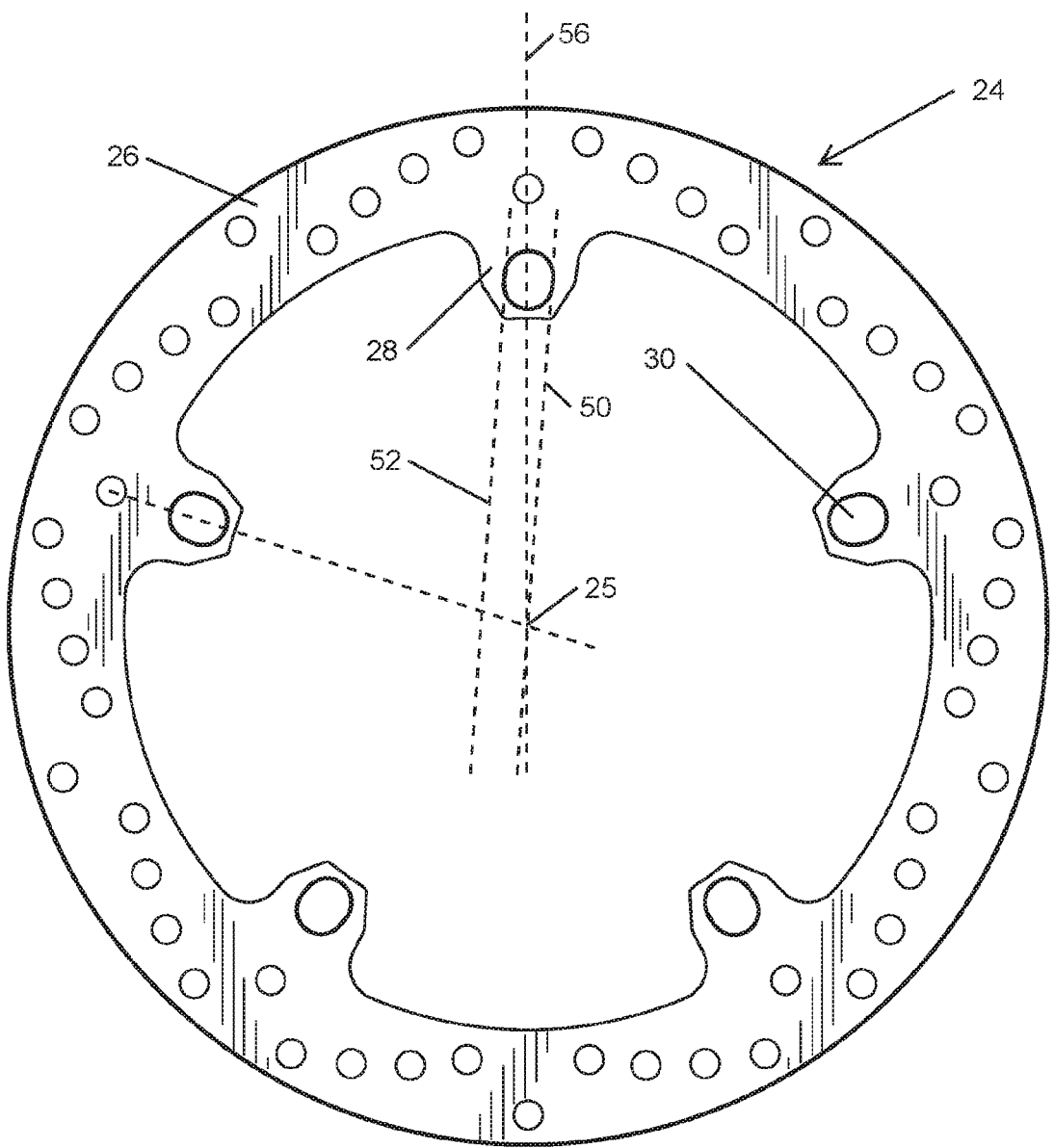
FIG. 5 is a plan view of the rotor of FIG. 2.

FIG. 1 illustrates a vehicle 10 having wheels 12 and a braking system for applying a braking force to the wheels 12. Although an ATV is illustrated, it should be understood that the concepts of the present invention could be applied to other vehicles, such as snowmobiles, UTVs, motorcycles, and automobiles. The braking system includes brake levers 16 mounted on handlebars 18, brake lines 20 extending from the brake levers 16, brake calipers (not shown) mounted to a vehicle frame or fork, and brake rotors 24 mounted on the wheels 12 for rotation about a rotational axis 25. The present invention is directed to the structure for securing the rotors 24 to the wheels 12.

Each of the illustrated rotors 24 includes a disk portion 26 that is adapted to be engaged by the corresponding caliper (not shown) to provide the desire braking forces, as is known in the art. Five mounting tabs 28 are equally circumferentially spaced and extend radially inwardly from the disk portion 26 to provide a means for mounting the rotor 24 to the wheel 12. Each mounting tab 28 includes an elongated mounting slot 30 that is dimensioned to receive a mounting assembly 32 that secures the rotor 24 to the wheel 12.

In the illustrated embodiment, the mounting assembly 32 includes a mounting rivet 34, a cover washer 36, and a mounting stud 38 positioned through the mounting rivet 34 and cover washer 36 and threaded to the wheel 12. The mounting rivet 34 and cover washer 36 sandwich the corresponding mounting tab 28. Spring washers 40 and thrust washers 42 are positioned between the mounting rivet 34 and the rotor 24 and between the cover washer 36 and the rotor 24 to bias the rotor 24 relative to the vehicle wheel 12 and to provide vibration damping.

Referring to FIG. 6, the mounting slot 30 is defined by first and second sidewalls 44,46 that guide movement of the mounting rivet 34 in the mounting slot 30. The first sidewall 44 defines and guides the edge of the mounting rivet 34 along a first guide axis 50 that substantially intersects the rotational axis 25, and the second sidewall 46 defines and guides an opposing edge of the mounting rivet 34 along a second guide axis 52 that is substantially parallel to the first guide axis 50. A center axis 54 is defined between the first guide axis 50 and the second guide axis 52. It can be seen that each illustrated mounting slot 30 (i.e., as directionally defined by the center axis 54) is tilted or askew relative to a corresponding radial axis 56 of the wheel 12. In the illustrated embodiment, each mounting slot 30 (e.g., defined by the corresponding center axis 54) is tilted about 3.9 degrees relative to a radial axis 56 extending through a center of the slot 30. It should be understood that the precise angle of the mounting slot 30 can vary slightly and can at least partially depend on the width of the slot and the radial distance of the slot from the rotational axis 25 of the wheel 12. For example, when the concepts of the present invention are applied to a larger diameter rotor (e.g., 320 mm), the mounting slots will have a smaller angle (e.g., about 2.5 degrees).

The illustrated mounting slot 30 further includes a first end wall 60 defining a first end of the mounting slot 30 and having a semi-cylindrical shape, and a second end wall 62 defining a second end of the mounting slot 30 and having a semi-cylindrical shape. The mounting slot has a width of about 13.8 mm and a length of about 16.6 mm. In this regard, it can be seen that the length is about 20% larger than the width.

Various features and advantages of the invention are set forth in the following claims.

The invention claim is:

1. A disk brake system comprising:
   a wheel defining a rotational axis;
   a caliper mounted adjacent the wheel;
   a rotor mounted for rotation with the wheel and engageable by the caliper, the rotor including first and second sidewalls that extend in an axial direction with respect to the rotational axis, the first sidewall defining a first axis that substantially intersects the rotational axis, and the second sidewall defining a second axis that is spaced from and substantially parallel to the first axis, wherein the first and second sidewalls define a mounting slot of the rotor; and
   a mounting post positioned in the mounting slot to secure the rotor to the wheel, wherein the mounting post includes a substantially cylindrical portion positioned in the mounting slot and having an exterior surface positioned to engage the first sidewall.

2. The disk brake system of claim 1, wherein the mounting slot further includes a first end wall defining a first end of the mounting slot and having a semi-cylindrical shape.

3. The disk brake system of claim 2, wherein the mounting slot further include a second end wall defining a second end of the mounting slot and having a semi-cylindrical shape.

4. The disk brake system of claim 1, wherein the rotor includes a plurality of mounting slots circumferentially spaced substantially equally around the rotational axis.

5. The disk brake system of claim 1, wherein the rotor includes five mounting slots.

6. The disk brake system of claim 1, wherein the mounting slot has a width and a length that is at least 10% larger than the width.

7. The disk brake system of claim 1, wherein the mounting slot defines a center axis that intersects a radial axis of the wheel at an angle of at least 1.5 degrees.

8. A brake rotor for a disk brake system and comprising:
   a body portion having opposing braking surfaces and defining a rotational axis;
   a mounting portion extending radially from the body portion and including first and second sidewalls that extend in an axial direction with respect to the rotational axis, the first sidewall defining a first axis that substantially intersects the rotational axis, and the second sidewall defining a second axis that is spaced from and substantially parallel to the first axis, wherein the first and second sidewalls define a mounting slot of the mounting portion; and
   a mounting post positioned in the mounting slot, wherein the mounting post includes a substantially cylindrical portion positioned in the mounting slot and having an exterior surface positioned to engage the first sidewall.

9. The brake rotor of claim 8, wherein the mounting slot further includes a first end wall defining a first end of the mounting slot and having a semi-cylindrical shape.

10. The brake rotor of claim 9, wherein the mounting slot further include a second end wall defining a second end of the mounting slot and having a semi-cylindrical shape.

11. The brake rotor of claim 8, wherein the rotor includes a plurality of mounting portions, each mounting portion including at least one mounting slot, the mounting portions being circumferentially spaced substantially equally around the rotational axis.

12. The brake rotor of claim 8, wherein the rotor includes five mounting portions, each mounting portion including at least one mounting slot.

13. The brake rotor of claim 8, wherein the mounting slot has a width and a length that is at least 10% larger than the width.

14. The brake rotor of claim 8, wherein the mounting slot defines a center axis that intersects a radial axis of the rotor at an angle of at least 1.5 degrees.

* * * * *